(12) United States Patent
Gao et al.

(10) Patent No.: US 10,826,574 B2
(45) Date of Patent: Nov. 3, 2020

(54) BEAM PROCESSING METHOD, BASE STATION, AND MOBILE TERMINAL

(71) Applicant: CHINA ACADEMY OF TELECOMMUNICATIONS TECHNOLOGY, Beijing (CN)

(72) Inventors: Qiubin Gao, Beijing (CN); Runhua Chen, Beijing (CN); Rakesh Tamrakar, Beijing (CN); Xin Su, Beijing (CN); Qiuping Huang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/330,731

(22) PCT Filed: Aug. 17, 2017

(86) PCT No.: PCT/CN2017/097881
§ 371 (c)(1),
(2) Date: Mar. 5, 2019

(87) PCT Pub. No.: WO2018/059154
PCT Pub. Date: Apr. 5, 2018

(65) Prior Publication Data
US 2019/0215039 A1    Jul. 11, 2019

(30) Foreign Application Priority Data
Sep. 30, 2016 (CN) .......................... 2016 1 0875890

(51) Int. Cl.
*H04B 7/04* (2017.01)
*H04B 7/0417* (2017.01)
(Continued)

(52) U.S. Cl.
CPC ......... *H04B 7/0421* (2013.01); *H04B 7/0617* (2013.01); *H04B 7/0634* (2013.01);
(Continued)

(58) Field of Classification Search
CPC .... H04B 7/0421; H04B 7/088; H04B 17/309; H04B 7/0617; H04B 7/0634;
(Continued)

(56) References Cited

U.S. PATENT DOCUMENTS

2008/0253297 A1    10/2008 Hulbert
2011/0244786 A1    10/2011 Fujii et al.
(Continued)

FOREIGN PATENT DOCUMENTS

CN        101088303 A        12/2007
CN        102208939 A        10/2011
(Continued)

OTHER PUBLICATIONS

Second Office Action and search report from CN app. No. 201610875890.X, dated Sep. 25, 2019, with machine English translation.
(Continued)

*Primary Examiner* — Kabir A Timory
(74) *Attorney, Agent, or Firm* — Ladas & Parry, LLP

(57) ABSTRACT

The beam processing method for use in the base station includes: transmitting a first downlink transmission beam training signal to a UE, and receiving first recommended beam-related information reported by the UE in accordance with the first downlink transmission beam training signal; transmitting a second downlink transmission beam training signal to the UE, and receiving second recommended beam-related information reported by the UE in accordance with the second downlink transmission beam training signal; determining a target downlink transmission beam in accor-
(Continued)

dance with the first recommended beam-related information and the second recommended beam-related information; and performing a switching operation on one or more currently-adopted valid downlink transmission beams in accordance with the target downlink transmission beam.

10 Claims, 4 Drawing Sheets

(51) Int. Cl.
*H04B 7/06* (2006.01)
*H04B 7/08* (2006.01)
*H04B 17/309* (2015.01)
*H04W 72/04* (2009.01)

(52) U.S. Cl.
CPC .......... *H04B 7/0695* (2013.01); *H04B 7/088* (2013.01); *H04B 17/309* (2015.01); *H04W 72/0406* (2013.01)

(58) Field of Classification Search
CPC .. H04B 7/0695; H04B 7/0413; H04B 7/0619; H04W 72/0406
See application file for complete search history.

(56) References Cited

U.S. PATENT DOCUMENTS

| | | | |
|---|---|---|---|
| 2013/0072243 A1 | 3/2013 | Yu et al. | |
| 2013/0102345 A1 | 4/2013 | Jung et al. | |
| 2015/0236772 A1 | 8/2015 | Hammarwall et al. | |
| 2015/0341105 A1 | 11/2015 | Yu et al. | |
| 2015/0351135 A1* | 12/2015 | Schmidt | H04W 76/10 455/450 |
| 2016/0183234 A1* | 6/2016 | Sung | H04W 72/046 370/329 |
| 2017/0085303 A1 | 3/2017 | Chen et al. | |
| 2017/0104517 A1 | 4/2017 | Kakishima et al. | |

FOREIGN PATENT DOCUMENTS

| | | |
|---|---|---|
| CN | 103918196 A | 7/2014 |
| CN | 104202073 A | 12/2014 |
| CN | 104734758 A | 6/2015 |
| CN | 105308880 A | 2/2016 |
| EP | 1808037 B1 | 2/2009 |
| EP | 2487953 A1 | 8/2012 |
| WO | 2015131494 A2 | 9/2015 |
| WO | 2015141066 A1 | 9/2015 |
| WO | 2015176679 A1 | 11/2015 |

OTHER PUBLICATIONS

First Office Action and Search Report from CN app. No. 201610875890.X, dated Apr. 18, 2019, with machine English translation.
Extended European Search Report from EP app. No. 17854606.5, dated Jun. 7, 2019.
First Office Action and Search Report from TW app. No. 106128705, dated Jun. 26, 2018, with machine English translation.
Written Opinion of the International Searching Authority from PCT/CN2017/097881, dated Sep. 27, 2019, with English translation provided by WIPO.
International Preliminary Report on Patentability from PCT/CN2017/097881, dated Apr. 2, 2019, with English translation from WIPO.
"Discussion on NR beamforming with UW-group-specific beam sweeping" R1-166219, 3GPP-TSG-RAN WG1 Meeting #86, Gothenburg, Sweden, Aug. 22-26, 2016.
"Principles for Reference Signal Design and QCL Assumptions for NR", R1-167224, 3GPP TSG RAN WG1 Meeting #86, Gothenburg, Sweden, Aug. 22-26, 2016.
International Search Report for PCT/CN2017/097881 dated Sep. 27, 2017 and its English translation provided by WIPO.
Written Opinion of the International Searching Authority for PCT/CN2017/097881 dated Sep. 27, 2017 and its English translation provided by Google Translate.

* cited by examiner

__US 10,826,574 B2__

1

BEAM PROCESSING METHOD, BASE STATION, AND MOBILE TERMINAL

CROSS-REFERENCE TO RELATED APPLICATIONS

The present application is the U.S. national phase of PCT Application No. PCT/CN2017/097881 filed on Aug. 17, 2017, which claims priority to the Chinese patent application 201610875890.X filed on Sep. 30, 2016, the disclosures of which are incorporated herein by reference in their entireties.

TECHNICAL FIELD

The present disclosure relates to the field of communication technology, in particular to a beam processing method, a base station and a mobile terminal.

BACKGROUND

Multiple-Input Multiple-Output (MIMO) technique plays an important role in improving a peak rate and a system spectrum utilization rate, so such a wireless access technology standard as Long Term Evolution (LTE) or LTE-Advanced (LTE-A) is established on the basis of MIMO+ Orthogonal Frequency Division Multiplexing (OFDM). For the MIMO technique, its performance gain is derived from a spatial freedom degree capable of being acquired by a multi-antenna system, so the most important development direction of the standardization of the MIMO technology lies in the extension of dimensions.

An LTE Release 8 (Rel-8) system may support the MIMO transmission through at most four layers. An LTE Rel-9 system focuses on the enhancement of a Multi-User MIMO (MU-MIMO) technique, and it may support the MU-MIMO transmission through at most four downlink data layers in a Transmission Mode (TM)-8. In an LTE Rel-10 system, eight antenna ports may be supported, so as to improve a spatial resolution of Channel State Information (CSI) and extend a transmission capability of Single-User MIMO (SU-MIMO) to at most eight data layers. In Rel-13 and Rel-14 systems, a Full Dimension-MIMO (FD-MIMO) technique has been introduced so as to support 32 antenna ports, thereby to achieve a beamforming operation in horizontal and vertical dimensions.

In order to further improve the MIMO technology, a massive antenna technique has been introduced into a mobile communication system. For a base station, a massive, full-digital antenna includes up to 128, 256 or 512 antenna elements, and up to 128, 256 or 512 transceivers, and each antenna element is connected to one transceiver. Through the transmission of a pilot signal through up to 128, 256 or 512 antenna ports, it is able for a User Equipment (UE) to measure the CSI and transmit a feedback message. The UE may also be configured with an antenna array including up to 32 or 64 antenna elements. Through beamforming operations at the base station and the UE, it is able to acquire a huge beamforming gain, thereby to prevent the occurrence of signal attenuation caused by path losses. Especially for communication at a high frequency band, e.g., at a frequency of 30 GHz, a radio signal has a very limited coverage range due to the path losses. Through the massive antenna technique, it is able to extend the coverage range of the radio signal to an applicable range.

For a full digital antenna array, each antenna element is provided with an individual transceiver, so a size of a resultant device as well as the cost and power consumption thereof may increase significantly. Especially for an analog-to-digital converter (ADC) and a digital-to-analog converter (DAC) of the transceiver, it is merely able to decrease the power consumption and increase the performance in a limited manner. In order to reduce the size, the cost and the power consumption of the device, an analog beamforming-based scheme has been presented, as shown in FIG. 7 and FIG. 8. As a main feature of the analog beamforming technique, a mid-frequency signal (in FIG. 7) or a radio frequency signal (in FIG. 8) is weighted and beamformed through a phase shifter.

In order to further improve the analog beamforming performance, digital-analog hybrid beamforming transmission/reception architecture has been proposed, as shown in FIG. 9. In FIG. 9, a transmitting end and a receiving end are provided with $N_{RF}^T$ and $N_{RF}^R$ transceivers respectively, the quantity $N^T$ of the antenna elements at the transmitting end is greater than $N_{RF}^T$, the quantity $N^R$ of the antenna elements at the receiving end is greater than $N_{RF}^R$, and the quantity of maximum parallel transport streams supported by the beamforming operation is $\min(N_{RF}^T, N_{RF}^R)$. For the hybrid beamforming architecture in FIG. 9, a balance has been made between the digital beamforming flexibility and the low analog beamforming complexity.

For both the analog beamforming and the digital-analog hybrid beamforming, it is necessary to adjust a an analog beamforming weight value at the transmitting end and the receiving end, so as to enable a resultant beam to be directed to an opposite end. Usually, the beamforming weight value is acquired through transmitting a training signal. However, during a conventional beam training operation, it is impossible to make a balance between the overhead and the precision.

SUMMARY

An object of the present disclosure is to provide a beam processing method, a base station and a mobile terminal, so as to make a balance between the overhead and the precision during the beam training operation.

In one aspect, the present disclosure provides in some embodiments a beam processing method for use at a base station, including: transmitting a first downlink transmission beam training signal to a UE, and receiving first recommended beam-related information reported by the UE in accordance with the first downlink transmission beam training signal; transmitting a second downlink transmission beam training signal to the UE, and receiving second recommended beam-related information reported by the UE in accordance with the second downlink transmission beam training signal; determining a target downlink transmission beam in accordance with the first recommended beam-related information and the second recommended beam-related information; and performing a switching operation on one or more currently-adopted valid downlink transmission beams in accordance with the target downlink transmission beam.

In some possible embodiments of the present disclosure, the transmitting the first downlink transmission beam training signal to the UE and receiving the first recommended beam-related information reported by the UE in accordance with the first downlink transmission beam training signal includes: determining a first set including a plurality of downlink transmission beams, each downlink transmission beam corresponding to a group of beamforming weight values; beamforming each downlink transmission beam in the first set in accordance with a corresponding beamforming weight value, so as to acquire the first downlink transmission beam training signal; transmitting the first downlink transmission beam training signal to the UE, so as to enable the UE to determine a first recommended beam in accordance with a predetermined measurement index for the first downlink transmission beam training signal, and enable the UE to determine a downlink reception beam corresponding to the first recommended beam or each downlink transmission beam in the first set; and receiving the first recommended beam-related information reported by the UE.

In some possible embodiments of the present disclosure, the transmitting the second downlink transmission beam training signal to the UE and receiving the second recommended beam-related information reported by the UE in accordance with the second downlink transmission beam training signal includes: determining a second set including a plurality of downlink transmission beams associated with the valid downlink transmission beam, each downlink transmission beam corresponding to a group of beamforming weight values; beamforming each downlink transmission beam in the second set in accordance with a corresponding beamforming weight value, so as to acquire the second downlink transmission beam training signal; transmitting the second downlink transmission beam training signal to the UE, so as to enable the UE to determine a second recommended beam in accordance with a predetermined measurement index for the second downlink transmission beam training signal; and receiving the second recommended beam-related information reported by the UE.

In some possible embodiments of the present disclosure, a spatial correlation between each downlink transmission beam in the second set and the valid downlink transmission beam is greater than a predetermined threshold; or an angle difference between a spatial orientation of each downlink transmission beam in the second set and a spatial orientation of the valid downlink transmission beam is within a predetermined range; or the second set is a predefined set corresponding to the valid downlink transmission beam.

In some possible embodiments of the present disclosure, the second downlink transmission beam training signal and a training signal acquired after beamforming the valid downlink transmission beam in accordance with the corresponding beamforming weight value are quasi co-located (QCL) with respect to one or more spatial angle parameters.

In some possible embodiments of the present disclosure, the performing the switching operation on the currently-adopted valid downlink transmission beam in accordance with the target downlink transmission beam includes: when the target downlink transmission beam is different from the valid downlink transmission beam, determining whether the target downlink transmission beam is included in the second set; when the target downlink transmission beam is included in the second set, switching the valid downlink transmission beam into the target downlink transmission beam: and when the target downlink transmission beam is not included in the second set, transmitting a downlink transmission beam switching notification message to the UE so as to enable the UE to update information about the valid downlink transmission beam stored in the UE in accordance with the downlink transmission beam switching notification message, and switch the valid downlink transmission beam into the target downlink transmission beam.

In some possible embodiments of the present disclosure, the downlink transmission beam switching notification message includes one or more of identification information about the target downlink transmission beam, information about a time interval, or indication information about a valid time-domain resource.

In some possible embodiments of the present disclosure, the first recommended beam-related information includes one or more of identification information about the first recommended beam, downlink time information, downlink frequency information, and intensity information about the first downlink transmission beam training signal. The second recommended beam-related information includes one or more of identification information about the second recommended beam, downlink time information, downlink frequency information, and intensity information about the second downlink transmission beam training signal.

In some possible embodiments of the present disclosure, the beam processing method further includes transmitting a downlink reception beam training signal to the UE, so as to enable the UE to determine a target downlink reception beam in accordance with a predetermined measure index for the downlink reception beam training signal, and enable the UE to perform a switching operation on a currently-adopted valid downlink reception beam in accordance with the target downlink reception beam.

In some possible embodiments of the present disclosure, the downlink reception beam training signal and the training signal acquired after beamforming the valid downlink transmission beam in accordance with the corresponding beamforming weight value are QCL with respect to one or more spatial angle parameters.

In another aspect, the present disclosure provides in some embodiments a base station, including: a first transceiver module configured to transmit a first downlink transmission beam training signal to a UE, and receive first recommended beam-related information reported by the UE in accordance with the first downlink transmission beam training signal: a second transceiver module configured to transmit a second downlink transmission beam training signal to the UE, and receive second recommended beam-related information reported by the UE in accordance with the second downlink transmission beam training signal; a first determination module configured to determine a target downlink transmission beam in accordance with the first recommended beam-related information and the second recommended beam-related information; and a first switching module configured to perform a switching operation on one or more currently-adopted valid downlink transmission beams in accordance with the target downlink transmission beam.

In some possible embodiments of the present disclosure, the first transceiver module includes: a first determination unit configured to determine a first set including a plurality of downlink transmission beams, each downlink transmission beam corresponding to a group of beamforming weight values: a first beamforming unit configured to beamform each downlink transmission beam in the first set in accordance with a corresponding beamforming weight value, so as to acquire the first downlink transmission beam training signal; a first transmission unit configured to transmit the first downlink transmission beam training signal to the UE, so as to enable the UE to determine a first recommended beam in accordance with a predetermined measurement index for the first downlink transmission beam training signal, and enable the UE to determine a downlink reception beam corresponding to the first recommended beam or each downlink transmission beam in the first set; and a first reception unit configured to receive the first recommended beam-related information reported by the UE.

In some possible embodiments of the present disclosure, the second transceiver module includes: a second determination unit configured to determine a second set including a plurality of downlink transmission beams associated with the valid downlink transmission beam, each downlink transmission beam corresponding to a group of beamforming weight values; a second beamforming unit configured to beamform each downlink transmission beam in the second set in accordance with a corresponding beamforming weight value, so as to acquire the second downlink transmission beam training signal: a second transmission unit configured to transmit the second downlink transmission beam training signal to the UE, so as to enable the UE to determine a second recommended beam in accordance with a predetermined measurement index for the second downlink transmission beam training signal: and a second reception unit configured to receive the second recommended beam-related information reported by the UE.

In some possible embodiments of the present disclosure, a spatial correlation between each downlink transmission beam in the second set and the valid downlink transmission beam is greater than a predetermined threshold; or an angle difference between a spatial orientation of each downlink transmission beam in the second set and a spatial orientation of the valid downlink transmission beam is within a predetermined range; or the second set is a predefined set corresponding to the valid downlink transmission beam.

In some possible embodiments of the present disclosure, the second downlink transmission beam training signal and a training signal acquired after beamforming the valid downlink transmission beam in accordance with the corresponding beamforming weight value are QCL with respect to one or more spatial angle parameters.

In some possible embodiments of the present disclosure, the first switching module includes: a first determination unit configured to, when the target downlink transmission beam is different from the valid downlink transmission beam, determine whether the target downlink transmission beam is included in the second set; a first switching unit configured to, when the target downlink transmission beam is included in the second set, switch the valid downlink transmission beam into the target downlink transmission beam; and a second switching unit configured to, when the target downlink transmission beam is not included in the second set, transmit a downlink transmission beam switching notification message to the UE so as to enable the UE to update information about the valid downlink transmission beam stored in the UE in accordance with the downlink transmission beam switching notification message, and switch the valid downlink transmission beam into the target downlink transmission beam.

In some possible embodiments of the present disclosure, the downlink transmission beam switching notification message includes one or more of identification information about the target downlink transmission beam, information about a time interval, or indication information about a valid time-domain resource.

In some possible embodiments of the present disclosure, the first recommended beam-related information includes one or more of identification information about the first recommended beam, downlink time information, downlink frequency information, and intensity information about the first downlink transmission beam training signal. The second recommended beam-related information includes one or more of identification information about the second recommended beam, downlink time information, downlink frequency information, and intensity information about the second downlink transmission beam training signal.

In some possible embodiments of the present disclosure, the base station further includes a transmission module configured to transmit a downlink reception beam training signal to the UE, so as to enable the UE to determine a target downlink reception beam in accordance with a predetermined measure index for the downlink reception beam training signal, and enable the UE to perform a switching operation on a currently-adopted valid downlink reception beam in accordance with the target downlink reception beam.

In some possible embodiments of the present disclosure, the downlink reception beam training signal and the training signal acquired after beamforming the valid downlink transmission beam in accordance with the corresponding beamforming weight value are QCL with respect to one or more spatial angle parameters.

In yet another aspect, the present disclosure provides in some embodiments a beam processing method for use in a UE, including: receiving a first downlink transmission beam training signal from a base station, and determining a first recommended beam in accordance with the first downlink transmission beam training signal, the first downlink transmission beam training signal being acquired after beamforming by the base station each downlink transmission beam in a first set in accordance with a corresponding beamforming weight value, the first set including a plurality of downlink transmission beams, each downlink transmission beam corresponding to one group of beamforming weight values; reporting first recommended beam-related information to the base station; receiving a second downlink transmission beam training signal from the base station, and determining a second recommended beam in accordance with the second downlink transmission beam training signal; and reporting second recommended beam-related information to the base station, so as to enable the base station to determine a target downlink transmission beam in accordance with the first recommended beam-related information and the second recommended beam-related information, and enable the base station to perform a switching operation on one or more currently-adopted valid downlink transmission beams in accordance with the target downlink transmission beam.

In some possible embodiments of the present disclosure, the determining the first recommended beam in accordance with the first downlink transmission beam training signal includes determining the first recommended beam in accordance with a predetermined measurement index for the first downlink transmission beam training signal.

In some possible embodiments of the present disclosure, subsequent to determining the first recommended beam in accordance with the first downlink transmission beam training signal, the beam processing method further includes determining a downlink reception beam corresponding to the first recommended beam or each downlink transmission beam in the first set from predetermined candidate downlink reception beams in accordance with the predetermined measurement index for the first downlink transmission beam training signal received after beamforming each predetermined candidate downlink reception beam in accordance with a corresponding beamforming weight value.

In some possible embodiments of the present disclosure, the determining the second recommended beam in accordance with the second downlink transmission beam training signal includes: determining the second recommended beam in accordance with a predetermined measurement index for a second downlink transmission beam training signal received after beamforming a currently-adopted valid downlink reception beam in accordance with a corresponding beamforming weight value, the second downlink transmission beam training signal being acquired after beamforming each downlink transmission beam in a second set in accordance with a corresponding beamforming weight value, the second set including a plurality of downlink transmission beams associated with the valid downlink transmission beam, each downlink transmission beam corresponding to a group of beamforming weight values.

In some possible embodiments of the present disclosure, the beam processing method further includes: receiving a downlink transmission beam switching notification message, the downlink transmission beam switching notification message including one or more of identification information about the target downlink transmission beam, information about a time interval, or indication information about a valid time-domain resource, the target downlink transmission beam being included in the first set; and updating information about the valid downlink transmission beam stored in the UE in accordance with the downlink transmission beam switching notification message.

In some possible embodiments of the present disclosure, subsequent to updating the information about the valid downlink transmission beam stored in the UE in accordance with the downlink transmission beam switching notification message, the beam processing method further includes switching the valid downlink reception beam in accordance with the updated information about the valid downlink transmission beam.

In some possible embodiments of the present disclosure, the beam processing method further includes: receiving a downlink reception beam training signal, and determining a target downlink reception beam in accordance with a predetermined measurement index for the downlink reception beam training signal; and performing a switching operation on the currently-adopted downlink reception beam in accordance with the target downlink reception beam.

In some possible embodiments of the present disclosure, the determining the target downlink reception beam in accordance with the predetermined measurement index for the downlink reception beam training signal includes determining the target downlink reception beam from predetermined candidate downlink reception beams in accordance with the predetermined measurement index for the downlink reception beam training signal received after beamforming each predetermined candidate downlink reception beam in accordance with a corresponding beamforming weight value.

In some possible embodiments of the present disclosure, the downlink reception beam training signal and the training signal acquired after beamforming the valid downlink transmission beam in accordance with the corresponding beamforming weight value are QCL with respect to one or more spatial angle parameters.

In some possible embodiments of the present disclosure, the predetermined measurement index includes a received signal power intensity or a signal-to-noise ratio (SNR).

In still yet another aspect, the present disclosure provides in some embodiments a mobile terminal, including: a second determination module configured to receive a first downlink transmission beam training signal from a base station, and determine a first recommended beam in accordance with the first downlink transmission beam training signal, the first downlink transmission beam training signal being acquired after beamforming by the base station each downlink transmission beam in a first set in accordance with a corresponding beamforming weight value, the first set including a plurality of downlink transmission beams, each downlink transmission beam corresponding to one group of beamforming weight values; a first report module configured to report first recommended beam-related information to the base station; a third determination module configured to receive a second downlink transmission beam training signal from the base station, and determine a second recommended beam in accordance with the second downlink transmission beam training signal: and a second report module configured to report second recommended beam-related information to the base station, so as to enable the base station to determine a target downlink transmission beam in accordance with the first recommended beam-related information and the second recommended beam-related information, and enable the base station to perform a switching operation on one or more currently-adopted valid downlink transmission beams in accordance with the target downlink transmission beam.

In some possible embodiments of the present disclosure, the second determination module includes a third determination unit configured to determine the first recommended beam in accordance with a predetermined measurement index for the first downlink transmission beam training signal.

In some possible embodiments of the present disclosure, the mobile terminal further includes a fourth determination module configured to determine a downlink reception beam corresponding to the first recommended beam or each downlink transmission beam in the first set from predetermined candidate downlink reception beams in accordance with the predetermined measurement index for the first downlink transmission beam training signal received after beamforming each predetermined candidate downlink reception beam in accordance with a corresponding beamforming weight value.

In some possible embodiments of the present disclosure, the third determination module includes a fourth determination unit configured to determine the second recommended beam in accordance with a predetermined measurement index for a second downlink transmission beam training signal received after beamforming a currently-adopted valid downlink reception beam in accordance with a corresponding beamforming weight value, the second downlink transmission beam training signal is acquired after beamforming each downlink transmission beam in a second set in accordance with a corresponding beamforming weight value, the second set includes a plurality of downlink transmission beams associated with the valid downlink transmission beam, and each downlink transmission beam corresponds to a group of beamforming weight values.

In some possible embodiments of the present disclosure, the mobile terminal further includes: a first reception module configured to receive a downlink transmission beam switching notification message, the downlink transmission beam switching notification message including one or more of identification information about the target downlink transmission beam, information about a time interval, or indication information about a valid time-domain resource, the target downlink transmission beam being included in the first set; and an update module configured to update information about the valid downlink transmission beam stored in the UE in accordance with the downlink transmission beam switching notification message.

In some possible embodiments of the present disclosure, the mobile terminal further includes a second switching module configured to switch the valid downlink reception beam in accordance with the updated information about the valid downlink transmission beam.

In some possible embodiments of the present disclosure, the mobile terminal further includes: a fifth determination module configured to receive a downlink reception beam training signal, and determine a target downlink reception beam in accordance with a predetermined measurement index for the downlink reception beam training signal: and a third switching module configured to perform a switching operation on the currently-adopted downlink reception beam in accordance with the target downlink reception beam.

In some possible embodiments of the present disclosure, the fifth determination module includes a fifth determination unit configured to determine the target downlink reception beam from predetermined candidate downlink reception beams in accordance with the predetermined measurement index for the downlink reception beam training signal received after beamforming each predetermined candidate downlink reception beam in accordance with a corresponding beamforming weight value.

In some possible embodiments of the present disclosure, the downlink reception beam training signal and the training signal acquired after beamforming the valid downlink transmission beam in accordance with the corresponding beamforming weight value are QCL with respect to one or more spatial angle parameters.

In some possible embodiments of the present disclosure, the predetermined measurement index includes a received signal power intensity or an SNR.

In still yet another aspect, the present disclosure provides in some embodiments a base station, including a processor, a transceiver and a memory. The processor is configured to read a program stored in the memory, so as to: transmit through the transceiver a first downlink transmission beam training signal to a UE, and receive first recommended beam-related information reported by the UE in accordance with the first downlink transmission beam training signal: transmit through the transceiver a second downlink transmission beam training signal to the UE, and receive second recommended beam-related information reported by the UE in accordance with the second downlink transmission beam training signal; determine a target downlink transmission beam in accordance with the first recommended beam-related information and the second recommended beam-related information; and perform a switching operation on one or more currently-adopted valid downlink transmission beams in accordance with the target downlink transmission beam.

In still yet another aspect, the present disclosure provides in some embodiments a mobile terminal, including a processor, a transceiver and a memory. The processor is configured to read a program stored in the memory, so as to: receive through the transceiver a first downlink transmission beam training signal from a base station, and determine a first recommended beam in accordance with the first downlink transmission beam training signal, the first downlink transmission beam training signal being acquired after beamforming by the base station each downlink transmission beam in a first set in accordance with a corresponding beamforming weight value, the first set including a plurality of downlink transmission beams, each downlink transmission beam corresponding to one group of beamforming weight values, report through the transceiver first recommended beam-related information to the base station; receive through the transceiver a second downlink transmission beam training signal from the base station, and determine a second recommended beam in accordance with the second downlink transmission beam training signal: and report through the transceiver second recommended beam-related information to the base station, so as to enable the base station to determine a target downlink transmission beam in accordance with the first recommended beam-related information and the second recommended beam-related information, and enable the base station to perform a switching operation on one or more currently-adopted valid downlink transmission beams in accordance with the target downlink transmission beam.

According to the beam processing method in the embodiments of the present disclosure, the base station may transmit the first downlink transmission beam training signal to the UE, and receive the first recommended beam-related information reported by the UE in accordance with the first downlink transmission beam training signal. Next, the base station may transmit the second downlink transmission beam training signal to the UE, and receive the second recommended beam-related information reported by the UE in accordance with the second downlink transmission beam training signal. Next, the base station may determine the target downlink transmission beam in accordance with the first recommended beam-related information and the second recommended beam-related information. Finally, the base station may perform the switching operation on the currently-adopted valid downlink transmission beam in accordance with the target downlink transmission beam. As a result, it is able to provide the downlink transmission beam determined after a two-stage beam training operation with high precision and small overhead, thereby to make a balance between the overhead and the precision during the beam training operation.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

An object of the present disclosure is to provide a beam processing method, a base station and a mobile terminal, so as to perform a switching operation on a valid downlink transmission beam through a two-stage beam training operation, thereby to make a balance between precision and overhead.

The beam processing method, the base station and the mobile terminal in the embodiments of the present disclosure may be applied to analog beamforming, digital-analog hybrid beamforming, and digital beamforming.

Figure 1:
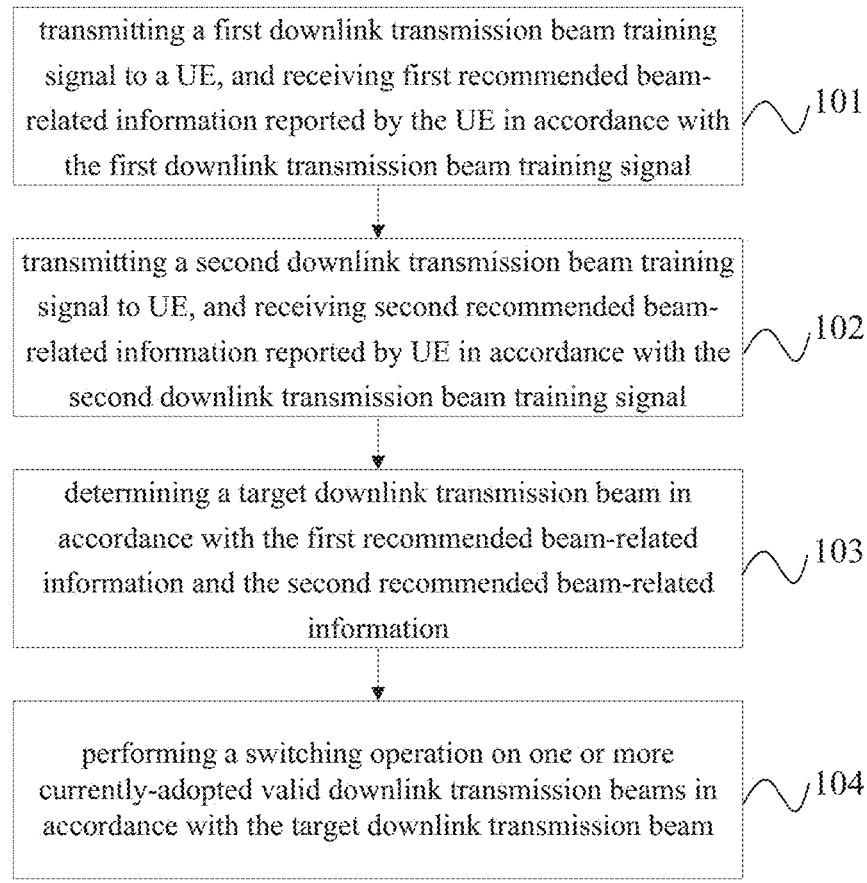
FIG. 1 is a flow chart of a beam processing method for use in a base station according to some embodiments of the present disclosure.

As shown in FIG. 1, the present disclosure provides in some embodiments a beam processing method for use in a base station, which includes the following steps.

Step 101: transmitting a first downlink transmission beam training signal to a UE, and receiving first recommended beam-related information reported by the UE in accordance with the first downlink transmission beam training signal. Here, the base station may transmit the first downlink transmission beam training signal to the UE, so as to acquire the first recommended beam-related information.

Step 102: transmitting a second downlink transmission beam training signal to the UE, and receiving second recommended beam-related information reported by the UE in accordance with the second downlink transmission beam training signal. Here, the base station may transmit the second downlink transmission beam training signal to the UE, so as to acquire the second recommended beam-related information.

An order of Steps 101 and 102 may not be particularly defined herein, i.e., Step 101 may be executed before or after Step 102, or Step 101 and 102 may be executed simultaneously.

Step 103: determining a target downlink transmission beam in accordance with the first recommended beam-related information and the second recommended beam-related information. Here, the target downlink transmission beam determined in accordance with the first and second recommended beam-related information may have very high precision and a small overhead.

A downlink transmission beam having a maximum signal intensity or SNR may be selected from a first recommended beam and a second recommended beam in accordance with the first recommended beam-related information and the second recommended beam-related information, as the target downlink transmission beam.

Step 104: performing a switching operation on one or more currently-adopted valid downlink transmission beams in accordance with the target downlink transmission beam. Here, when the target downlink transmission beam is different from the currently-adopted valid downlink transmission beam, the currently-adopted valid downlink transmission beam may be switched into the target downlink transmission beam.

The currently-adopted valid downlink transmission beam refers to a downlink transmission beam currently adopted by the base station for transmitting data and signals to the UE. When the currently-adopted valid downlink transmission beam has been switched into the target downlink transmission beam, the target downlink transmission beam may become a new valid downlink transmission beam, i.e., a downlink transmission beam adopted by the base station for the transmission of data and signals.

According to the beam processing method in the embodiments of the present disclosure, it is able to provide the downlink transmission beam determined after a two-stage beam training operation with high precision and small overhead, thereby to make a balance between the overhead and the precision during the beam training operation.

In some possible embodiments of the present disclosure, Step 101 may include the following steps.

Step 1011: determining a first set including a plurality of downlink transmission beams, each downlink transmission beam corresponding to a group of beamforming weight values. Here, the first set may be determined at first. The first set may be a set of downlink transmission beams, e.g., $N_1$ downlink transmission beams, and each downlink transmission beam may correspond to a group of beamforming weight values. A beamforming weight value $W_n$ corresponding to an $n^{th}$ downlink transmission beam may be calculated through an equation $W_n = [w_1^n, w_2^n \ldots w_K^n]^T$, where K represents the quantity of antenna elements for a beamforming operation and it may be smaller than the quantity of antenna elements for the base station, $N_1$, K and n are each an integer greater than or equal to 1, and n is smaller than or equal to $N_1$.

Step 1012: beamforming each downlink transmission beam in the first set in accordance with a corresponding beamforming weight value, so as to acquire the first downlink transmission beam training signal. Here, a downlink beam training signal may be transmitted for each downlink transmission beam in the first set, i.e., each downlink transmission beam in the first set may be beamformed in accordance with a corresponding beamforming weight value, so as to acquire a plurality of first downlink transmission training signals. For example, for $N_1$ downlink transmission beams, the base station may transmit $N_1$ first downlink transmission beam training signals.

The $N_1$ first downlink transmission beam training signals may be multiplexed in a Time-Division Multiplexing (TDM) manner, a Frequency-Division Multiplexing (FDM) manner, or a Code-Division Multiplexing (CDM) manner, or a combination thereof. For example, in an OFDM-based system, the $N_1$ first downlink transmission beam training signals may occupy $N_1$ OFDM symbols respectively, each training signal may occupy one single OFDM symbol, and at this time, the training signals may be multiplexed in a TDM manner. In addition, a plurality of training signals may occupy one OFDM symbol, and these training signals may be multiplexed in an FDM or CDM manner.

The beam training signal for each downlink transmission beam may be beamformed in accordance with a beamforming weight value corresponding to the downlink transmission beam and then transmitted. In the context, such expressions "transmitted through/on/using/via one beam" refer to that a signal is transmitted via an antenna after it has been beamformed in accordance with a beamforming weight value corresponding to a beam. When a signal to be transmitted on a resource element is s, a signal acquired after being beamformed through an $n^{th}$ beam may be $y=[y_1, y_2 \ldots y_K]^T = W_n s$, where $y_1$ may be mapped to an antenna element 1 for transmission, $y_2$ may be mapped to an antenna element 2 for transmission, . . . , and $y_K$ may be mapped to an antenna K for transmission, and K and n are each an integer greater than or equal to 1.

Step 1013: transmitting the first downlink transmission beam training signal to the UE, so as to enable the UE to determine a first recommended beam in accordance with a predetermined measurement index for the first downlink transmission beam training signal, and enable the UE to determine a downlink reception beam corresponding to the first recommended beam or each downlink transmission beam in the first set.

Here, when there are $N_1$ first downlink transmission beam training signals, the $N_1$ first downlink transmission beam training signals may be transmitted in one time or several times.

The first downlink transmission beam training signals may be transmitted periodically or aperiodically.

Upon the receipt of the first downlink transmission beam training signal from the base station, the UE may measure the first downlink transmission beam training signal so as to acquire the predetermined measurement index, and then determine the first recommended beam. The predetermined measurement index may be a received signal power intensity or an SNR. For example, the UE may select a beam having a maximum received signal power intensity as the first recommended beam. The first recommended beam may include one or more beams.

With respect to each first recommended beam or each downlink transmission beam in the first set, the UE may further determine a corresponding downlink reception beam. The downlink reception beam determined by the UE may be selected from predetermined candidate downlink reception beams. When there are $N_R^{UE}$ candidate downlink reception beams, each candidate downlink reception beam may correspond to a group of beamforming weight values. A beamforming weight value corresponding to an $m^{th}$ candidate downlink reception beam may be $V_m=[v_1^m, v_2^m \ldots v_L^m]^T$, where L represents the quantity of the antenna elements for beamforming and it may be smaller than the quantity of the antenna elements for the UE, $N_R^{UE}$, L and m are each an integer greater than or equal to 1, and m is smaller than or equal to $N_R^{UE}$. For one downlink transmission beam training signal (or any other signal), the UE may try to receive it through each candidate downlink reception beam, and select the reception beam having a maximum received signal power for receiving the downlink transmission beam.

The UE may store the downlink reception beam corresponding to the first recommended beam and a correspondence therebetween, or store the downlink reception beams corresponding to all the downlink transmission beams in the first set and a correspondence therebetween. Here, the stored downlink reception beam may be a serial number of the downlink reception beam in all the candidate downlink reception beams, or a beamforming weight value for the downlink reception beam. In this way, the UE may rapidly determine the downlink reception beam corresponding to each downlink transmission beam, so as to improve the processing efficiency.

Step 1014: receiving the first recommended beam-related information reported by the UE. Here, after the UE has determined the first recommended beam, the base station may receive the first recommended beam-related information reported by the UE.

At this time, the base station may acquire the first downlink transmission beam training signal in accordance with each downlink transmission beam in the first set, and transmit the first downlink transmission beam training signal to the UE, so as to acquire the first recommended beam-related information reported by the UE at relatively high precision.

Further, the first recommended beam-related information may include one or more of identification information about the first recommended beam, downlink time information, downlink frequency information, and intensity information about the first downlink transmission beam training signal.

Here, the first recommended beam-related information may include an identifier of the first recommended beam, e.g., a serial number of the downlink transmission beam. Depending on different multiplexing modes of the downlink transmission beam/beam training signal, the recommended beam-related information reported by the UE may be different. For example, when the downlink transmission beam training signal is multiplexed in a TDM manner in different OFDM symbols or subframes, the UE may measure the downlink transmission beam training signal, and report the selected downlink time information (an OFDM symbol index or a subframe index). For another example, when the downlink transmission beam training signal is multiplexed on different frequency resources (Physical Resource Blocks (PRBs) or sub-bands), the UE may measure the downlink transmission beam training signal, and report the selected downlink frequency information (a PRB index or a sub-band index). In addition, the first recommended beam-related information may further include the intensity information about the downlink transmission beam training signal received by the UE, e.g., received signal power level.

In some possible embodiments of the present disclosure, with reference to the description on Step 101, Step 102 may include the following steps.

Step 1021: determining a second set including a plurality of downlink transmission beams, each downlink transmission beam corresponding to a group of beamforming weight values. Here, the second set may be determined at first. The second set may be a set of downlink transmission beams associated with the valid downlink transmission beam, e.g., $N_2$ downlink transmission beams, and each downlink transmission beam may correspond to a group of beamforming weight values.

In some possible embodiments of the present disclosure, a correlation between each downlink transmission beam in the second set and the valid downlink transmission beam may be greater than a predetermined threshold, or an angle difference between a spatial orientation of each downlink transmission beam in the second set and a spatial orientation of the valid downlink transmission beam may be within a predetermined range, or the second set may be a predefined set corresponding to the valid downlink transmission beam. In some other scenarios, in order to expand a coverage range of the beams, the second set may include the beams in a larger range.

Step 1022: beamforming each downlink transmission beam in the second set in accordance with a corresponding beamforming weight value, so as to acquire the second downlink transmission beam training signal.

Here, a downlink transmission beam training signal may be transmitted for each downlink transmission beam in the second set, i.e., each downlink transmission beam in the second set may be beamformed in accordance with a corresponding beamforming weight value, so as to acquire a plurality of second downlink transmission training signals. For example, for $N_2$ downlink transmission beams, the base station may transmit $N_2$ second downlink transmission beam training signals, where $N_2$ is an integer greater than or equal to 1.

In some possible embodiments of the present disclosure, the second downlink transmission beam training signal and a training signal acquired after beamforming the valid downlink transmission beam in accordance with the corresponding beamforming weight value are quasi co-located (QCL) with respect to one or more spatial angle parameters. Each spatial angle parameter may be a spatial arrival angle average, a spatial arrival angle extension, a spatial departure angle average or a spatial departure angle extension.

Step 1023: transmitting the second downlink transmission beam training signal to the UE, so as to enable the UE to determine a second recommended beam in accordance with a predetermined measurement index for the second downlink transmission beam training signal.

Here, when there are $N_2$ second downlink transmission beam training signals, $N_2$ second downlink transmission beam training signals may be transmitted in one or several times.

The second downlink transmission beam training signals may be transmitted periodically or aperiodically.

Upon the receipt of the second downlink transmission beam training signal from the base station, the UE may measure the second downlink transmission beam training signal so as to acquire the predetermined measurement index, and then determine the second recommended beam. The predetermined measurement index may be a received signal power intensity or an SNR. For example, the UE may select a beam having a maximum received signal power intensity as the second recommended beam. The first recommended beam may include one or more beams.

Step 1024: receiving the second recommended beam-related information reported by the UE. Here, after the UE has determined the second recommended beam, the base station may receive the second recommended beam-related information reported by the UE.

At this time, the base station may acquire the second downlink transmission beam training signal in accordance with each downlink transmission beam in the second set, and transmit the second downlink transmission beam training signal to the UE, so as to acquire the second recommended beam-related information reported by the UE at relatively high precision.

Further, similar to the first recommended beam-related information, the second recommended beam-related information may include one or more of identification information about the second recommended beam, downlink time information, downlink frequency information, and intensity information about the second downlink transmission beam training signal.

Upon the receipt of the first recommended beam-related information and the second recommended beam-related information reported by the UE, the base station may determine whether it is necessary to switch the valid downlink transmission beam and the target downlink transmission beam to which the valid downlink transmission beam is to be switched.

The first recommended beam-related information and the second recommended beam-related information may not be necessarily reported simultaneously. They may be latest first recommended beam-related information and latest second recommended beam-related information acquired at a moment when the base station is performing the switching operation, and they may be reported at different moments.

In some possible embodiments of the present disclosure, Step 104 may include the following steps.

Step 1041: when the target downlink transmission beam is different from the valid downlink transmission beam, determining whether the target downlink transmission beam is included in the second set. Here, when the target downlink transmission beam is different from the valid downlink transmission beam, it means that it is necessary to perform the switching operation. At this time, it is necessary to determine whether the target downlink transmission beam is included in the second set.

Step 1042: when the target downlink transmission beam is included in the second set, switching the valid downlink transmission beam into the target downlink transmission beam. Here, when the target downlink transmission beam is included in the second set, it means that the target downlink transmission beam is associated with the valid downlink transmission beam, so it is unnecessary to transmit a downlink transmission beam switching notification message to the UE, and instead, the base station may directly switch the valid downlink transmission beam into the target transmission beam, so as to enable the UE to receive the target downlink transmission beam through a reception beam corresponding to the valid downlink transmission beam (i.e., a currently-adopted valid downlink reception beam).

Step 1043: when the target downlink transmission beam is not included in the second set, transmitting the downlink transmission beam switching notification message to the UE so as to enable the UE to update information about the valid downlink transmission beam stored in the UE in accordance with the downlink transmission beam switching notification message, and switch the valid downlink transmission beam into the target downlink transmission beam.

Here, when the target downlink transmission beam is not included in the second set, it means that the target downlink transmission beam is included in the first set, and at this time, it is necessary to transmit the downlink transmission beam switching notification message to the UE. After the downlink transmission beam switching notification message takes effect, the base station may switch the valid downlink transmission beam into the target downlink transmission beam, and the UE may update the information about the valid downlink transmission beam stored in the UE in accordance with the downlink transmission beam switching notification message. In addition, the UE may further switch the currently-adopted valid downlink reception beam into a downlink reception beam corresponding to the target downlink transmission beam in accordance with the updated information about the valid downlink transmission beam.

The currently-adopted valid downlink reception beam may refer to a downlink reception beam currently adopted by the UE for receiving data from the base station. When the currently-adopted valid downlink reception beam has been switched into the reception beam corresponding to the target downlink transmission beam, the reception beam corresponding to the target downlink transmission beam may become a new valid downlink reception beam, i.e., a downlink reception beam adopted by the UE for receiving the data from the base station.

At this time, when the target downlink transmission beam is included in the second set, it is unnecessary to transmit the downlink transmission beam switching notification message to the UE. In this way, it is unnecessary for the UE to perform the switching operation on the reception beam, thereby to save the resources and overhead.

Further, the downlink transmission beam switching notification message may include one or more of identification information about the target downlink transmission beam, information about a time interval, or indication information about a valid time-domain resource.

Here, the downlink transmission beam switching notification message may include the identification information about the target downlink transmission beam, so as to rapidly determine and find the target downlink transmission beam. An effective time of the downlink transmission beam switching notification message may be equal to a sum of a time when the UE has received the downlink transmission beam switching notification message and the time interval which has a constant value. The information about the time interval may be carried in the downlink transmission beam switching notification message. In addition, the downlink transmission beam switching notification message may further include the indication information about the valid time-domain resource, i.e., the indication information for indicating a position of a time-domain resource on which the target downlink transmission beam is to be applied by the UE. For example, the indication information may be adapted to indicate subframes (PRBs or sub-bands) within which the target downlink transmission beam is to be applied by the UE.

In some possible embodiments of the present disclosure, the beam processing method may further include Step 105 of transmitting a downlink reception beam training signal to the UE, so as to enable the UE to determine a target downlink reception beam in accordance with a predetermined measure index for the downlink reception beam training signal, and enable the UE to perform a switching operation on a currently-adopted valid downlink reception beam in accordance with the target downlink reception beam.

In some possible embodiments of the present disclosure, the downlink reception beam training signal and the training signal acquired after beamforming the valid downlink transmission beam in accordance with the corresponding beamforming weight value may be QCL with respect to one or more spatial angle parameters.

Here, the downlink reception beam training signal may be beamformed in accordance with a beamforming weight value corresponding to the valid downlink transmission beam, and then transmitted. A plurality of downlink reception beam training signals may be transmitted, and these downlink reception beam training signals may be multiplexed in a TDM, FDM or CDM manner.

The predetermined measurement index may be a received signal power intensity or an SNR. The UE may receive one downlink reception beam training signal through each candidate downlink reception beam, and select the reception beam having a maximum received signal power intensity as the target downlink reception beam.

When the target downlink reception beam is different from the currently-adopted valid downlink reception beam, the valid downlink reception beam may be switched into the target downlink reception beam, i.e., the target downlink reception beam may serve as a new valid downlink reception beam.

The downlink reception beam training signals may be transmitted periodically or aperiodically.

At this time, through the downlink reception beam training signals, it is able to acquire an optimum downlink reception beam.

In a word, according to the beam processing method in the embodiments of the present disclosure, it is able to provide the downlink transmission beam determined after a two-stage beam training operation with high precision and small overhead, thereby to make a balance between the overhead and the precision during the beam training operation.

Figure 2:
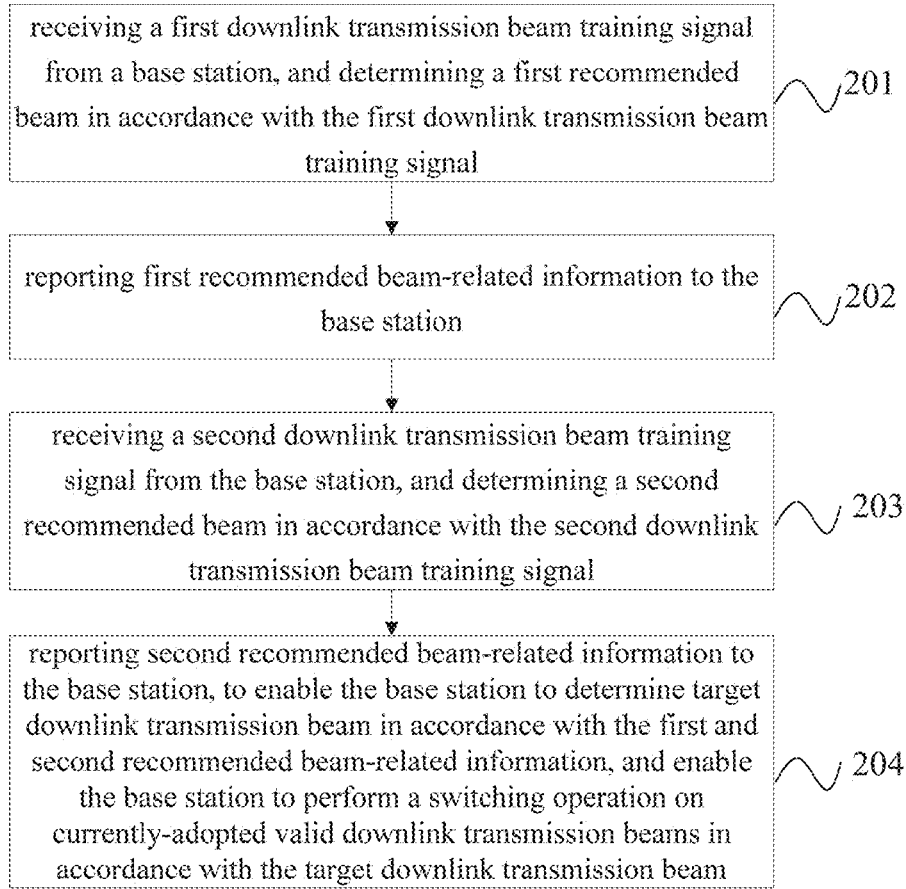
FIG. 2 is a flow chart of a beam processing method for use in a UE according to some embodiments of the present disclosure.

As shown in FIG. 2, the present disclosure further provides in some embodiments a beam processing method for use in a UE, which includes the following steps.

Step 201: receiving a first downlink transmission beam training signal from a base station, and determining a first recommended beam in accordance with the first downlink transmission beam training signal. Here, the UE may determine the first recommended beam in accordance with the received first downlink transmission beam training signal. The first downlink transmission beam training signal may be acquired after beamforming by the base station each downlink transmission beam in a first set in accordance with a corresponding beamforming weight value, the first set may include a plurality of downlink transmission beams, and each downlink transmission beam may correspond to one group of beamforming weight values.

Step 202: reporting first recommended beam-related information to the base station.

Step 203: receiving a second downlink transmission beam training signal from the base station, and determining a second recommended beam in accordance with the second downlink transmission beam training signal. Here, the UE may determine the second recommended beam in accordance with the received second downlink transmission beam training signal.

Step 204: reporting second recommended beam-related information to the base station, so as to enable the base station to determine a target downlink transmission beam in accordance with the first recommended beam-related information and the second recommended beam-related information, and enable the base station to perform a switching operation on one or more currently-adopted valid downlink transmission beams in accordance with the target downlink transmission beam. Here, through reporting the first recommended beam-related information and the second recommended beam-related information to the base station, it is able for the base station to determine the target downlink transmission beam having very high precision and a small overhead in accordance with the first recommended beam-related information and the second recommended beam-related information.

An order of Steps 201-202 and Steps 203-204 will not be particularly defined herein. To be specific, Steps 201-202 may be performed before or after Steps 203-204, or Steps 201-202 may be performed simultaneously with Steps 203-204.

The currently-adopted valid downlink transmission beam refers to a downlink transmission beam currently adopted by the base station for transmitting data and signals to the UE. When the currently-adopted valid downlink transmission beam has been switched into the target downlink transmission beam, the target downlink transmission beam may become a new valid downlink transmission beam, i.e., a downlink transmission beam adopted by the base station for the transmission of data and signals.

According to the beam processing method in the embodiments of the present disclosure, it is able to provide the downlink transmission beam determined after a two-stage beam training operation with high precision and small overhead, thereby to make a balance between the overhead and the precision during the beam training operation.

In some possible embodiments of the present disclosure. Step 201 may include Step 2011 of determining the first recommended beam in accordance with a predetermined measurement index for the first downlink transmission beam training signal. At this time, upon the receipt of the first downlink transmission beam training signal from the base station, the UE may measure the first downlink transmission beam training signal so as to acquire the predetermined measurement index, and then determine the first recommended beam. The predetermined measurement index may include a received signal power intensity or an SRN. For example, the UE may select a beam having a maximum training signal received power intensity as the first recommended beam. The first recommended beam may include one or more beams.

In some possible embodiments of the present disclosure, subsequent to Step 2011, the beam processing method may further include Step 2012 of determining a downlink reception beam corresponding to the first recommended beam or each downlink transmission beam in the first set from predetermined candidate downlink reception beams in accordance with the predetermined measurement index for the first downlink transmission beam training signal received after beamforming each predetermined candidate downlink reception beam in accordance with a corresponding beamforming weight value.

Here, with respect to each first recommended beam or each downlink transmission beam in the first set, the UE may further determine a corresponding downlink reception beam. The downlink reception beam determined by the UE may be selected from predetermined candidate downlink reception beams. When there are $N_R^{UE}$ candidate downlink reception beams, each candidate downlink reception beam may correspond to a group of beamforming weight values. A beamforming weight value corresponding to an $m^{th}$ candidate downlink reception beam may be $V_m = [v_1^m, v_2^m \ldots v_L^m]^T$, where L represents the quantity of the antenna elements for beamforming and it may be smaller than the quantity of the antenna elements for the UE, $N_R^{UE}$, L and m are each an integer greater than or equal to 1, and m is smaller than or equal to $N_R^{UE}$. For one downlink transmission beam training signal (or any other signal), the UE may try to receive it through each candidate downlink reception beam, and select the reception beam having a maximum received signal power for receiving the downlink transmission beam.

The UE may store the downlink reception beam corresponding to the first recommended beam and a correspondence therebetween, or store the downlink reception beams corresponding to all the downlink transmission beams in the first set and a correspondence therebetween. Here, the stored downlink reception beam may be a serial number of the downlink reception beam in all the candidate downlink reception beams, or a beamforming weight value for the downlink reception beam. In this way, the UE may rapidly determine the downlink reception beam corresponding to each downlink transmission beam, so as to improve the processing efficiency.

In some possible embodiments of the present disclosure, with reference to Step 2011, Step 203 may include Step 2031 of determining the second recommended beam in accordance with a predetermined measurement index for a second downlink transmission beam training signal received after beamforming a currently-adopted valid downlink reception beam in accordance with a corresponding beamforming weight value.

The second downlink transmission beam training signal may be acquired after beamforming each downlink transmission beam in a second set in accordance with a corresponding beamforming weight value, the second set may include a plurality of downlink transmission beams associated with the valid downlink transmission beam, and each downlink transmission beam may correspond to a group of beamforming weight values.

At this time, upon the receipt of the second downlink transmission beam training signal from the base station, the UE may measure the second downlink transmission beam training signal so as to determine the predetermined measurement index, and then determine the second recommended beam. The predetermined measurement index may include a received signal power intensity or an SNR. For example, the UE may select a beam having a maximum training signal received power intensity as the second recommended beam, and the second recommended beam may include one or more beams.

Further, the first recommended beam-related information may include one or more of identification information about the first recommended beam, downlink time information, downlink frequency information, and intensity information about the first downlink transmission beam training signal.

Here, the first recommended beam-related information may include an identifier of the first recommended beam, e.g., a serial number of the downlink transmission beam. Depending on different multiplexing modes of the downlink transmission beam/beam training signal, the recommended beam-related information reported by the UE may be different. For example, when the downlink transmission beam training signal is multiplexed in a TDM manner in different OFDM symbols or subframes, the UE may measure the downlink transmission beam training signal, and report the selected downlink time information (an OFDM symbol index or a subframe index). For another example, when the downlink transmission beam training signal is multiplexed on different frequency resources (PRBs or sub-bands), the UE may measure the downlink transmission beam training signal, and report the selected downlink frequency information (a PRB index or a sub-band index). In addition, the first recommended beam-related information may further include the intensity information about the downlink transmission beam training signal received by the UE, e.g., received signal power level.

Further, similar to the first recommended beam-related information, the second recommended beam-related information may include one or more of identification information about the second recommended beam, downlink time information, downlink frequency information, and intensity information about the second downlink transmission beam training signal.

In some possible embodiments of the present disclosure, the beam processing method may further include the following steps.

Step 205: receiving a downlink transmission beam switching notification message.

Further, the downlink transmission beam switching notification message may include one or more of identification information about the target downlink transmission beam, information about a time interval, or indication information about a valid time-domain resource. The target downlink transmission beam may be included in the first set.

Here, when it is necessary to switch the valid downlink transmission beam and the target downlink transmission beam is not included in the second set associated with the valid downlink transmission beam, the target downlink transmission beam may be included in the first set, and it is necessary for the base station to transmit the downlink transmission beam switching notification message to the UE.

Step 206: updating information about the valid downlink transmission beam stored in the UE in accordance with the downlink transmission beam switching notification message.

Here, after the downlink transmission beam switching notification message takes effect, the base station may switch the valid downlink transmission beam into the target downlink transmission beam, and the UE may update the information about the valid downlink transmission beam stored in the UE in accordance with the downlink transmission beam switching notification message.

In addition, subsequent to Step 206, the beam processing method may further include Step 207 of switching the valid downlink reception beam in accordance with the updated information about the valid downlink transmission beam.

Here, after updating the stored information about the valid downlink transmission beam, the UE may switch the valid downlink reception beam in accordance with the updated information about the valid downlink transmission beam. To be specific, the UE may switch the valid downlink reception beam into a downlink reception beam corresponding to the target downlink transmission beam.

Here, when it is necessary to switch the valid downlink transmission beam and the target downlink transmission beam is included in the second set associated with the valid downlink transmission beam, it means that the target downlink transmission beam is associated with the valid downlink transmission beam, so it is unnecessary for the base station to transmit the downlink transmission beam switching notification message to the UE, and instead, the base station may directly switch the valid downlink transmission beam into the target transmission beam, so as to enable the UE to receive the target downlink transmission beam through a reception beam corresponding to the valid downlink transmission beam (i.e., a currently-adopted valid downlink reception beam).

The currently-adopted valid downlink reception beam may refer to a downlink reception beam currently adopted by the UE for receiving data from the base station. When the currently-adopted valid downlink reception beam has been switched into the reception beam corresponding to the target downlink transmission beam, the reception beam corresponding to the target downlink transmission beam may become a new valid downlink reception beam, i.e., a downlink reception beam adopted by the UE for receiving the data from the base station.

At this time, when the target downlink transmission beam is included in the second set, it is unnecessary for the UE to perform the switching operation on the reception beam, thereby to save the resources and overhead.

In some possible embodiments of the present disclosure, the beam processing method may further include the following steps.

Step 208: receiving a downlink reception beam training signal, and determining a target downlink reception beam in accordance with a predetermined measurement index for the downlink reception beam training signal.

In some possible embodiments of the present disclosure, the downlink reception beam training signal and the training signal acquired after beamforming the valid downlink transmission beam in accordance with the corresponding beamforming weight value may be QCL with respect to one or more spatial angle parameters.

Here, the downlink reception beam training signal may be beamformed in accordance with a beamforming weight value corresponding to the valid downlink transmission beam, and then transmitted. A plurality of downlink reception beam training signals may be transmitted, and these downlink reception beam training signals may be multiplexed in a TDM, FDM or CDM manner.

The predetermined measurement index may be a received signal power intensity or an SNR.

Step 208 may include Step 2081 of determining the target downlink reception beam from predetermined candidate downlink reception beams in accordance with the predetermined measurement index for the downlink reception beam training signal received after beamforming each predetermined candidate downlink reception beam in accordance with a corresponding beamforming weight value.

Here, the UE may receive one downlink reception beam training signal through each candidate downlink reception beam, and select a reception beam having a maximum received signal power intensity as the target downlink reception beam.

Step 209: performing a switching operation on the currently-adopted downlink reception beam in accordance with the target downlink reception beam.

Here, when the target downlink reception beam is different from the currently-adopted valid downlink reception beam, the valid downlink reception beam may be switched into the target downlink reception beam, i.e., the target downlink reception beam may serve as a new valid downlink reception beam.

At this time, through the downlink reception beam training signals, it is able to acquire an optimum downlink reception beam.

In a word, according to the beam processing method in the embodiments of the present disclosure, it is able to provide the downlink transmission beam determined after a two-stage beam training operation with high precision and small overhead, thereby to make a balance between the overhead and the precision during the beam training operation.

Figure 3:
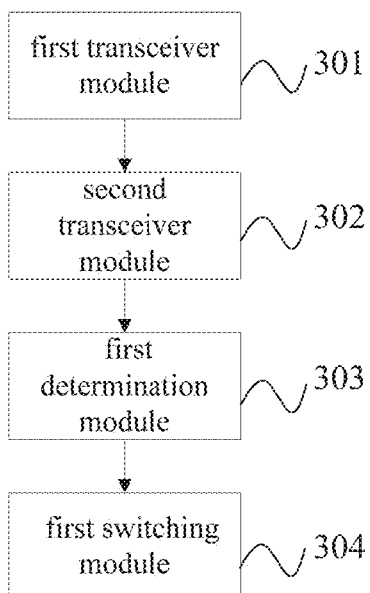
FIG. 3 is a schematic view showing the base station according to some embodiments of the present disclosure.

As shown in FIG. 3, the present disclosure provides in some embodiments a base station which includes: a first transceiver module 301 configured to transmit a first downlink transmission beam training signal to a UE, and receive first recommended beam-related information reported by the UE in accordance with the first downlink transmission beam training signal; a second transceiver module 302 configured to transmit a second downlink transmission beam training signal to the UE, and receive second recommended beam-related information reported by the UE in accordance with the second downlink transmission beam training signal; a first determination module 303 configured to determine a target downlink transmission beam in accordance with the first recommended beam-related information and the second recommended beam-related information; and a first switching module 304 configured to perform a switching operation on one or more currently-adopted valid downlink transmission beams in accordance with the target downlink transmission beam.

According to the base station in the embodiments of the present disclosure, it is able to provide the downlink transmission beam determined after a two-stage beam training operation with high precision and small overhead, thereby to make a balance between the overhead and the precision during the beam training operation.

In some possible embodiments of the present disclosure, the first transceiver module 301 may include: a first determination unit configured to determine a first set including a plurality of downlink transmission beams, each downlink transmission beam corresponding to a group of beamforming weight values; a first beamforming unit configured to beamform each downlink transmission beam in the first set in accordance with a corresponding beamforming weight value, so as to acquire the first downlink transmission beam training signal; a first transmission unit configured to transmit the first downlink transmission beam training signal to the UE, so as to enable the UE to determine a first recommended beam in accordance with a predetermined measurement index for the first downlink transmission beam training signal, and enable the UE to determine a downlink reception beam corresponding to the first recommended beam or each downlink transmission beam in the first set; and a first reception unit configured to receive the first recommended beam-related information reported by the UE.

In some possible embodiments of the present disclosure, the second transceiver module 302 may include: a second determination unit configured to determine a second set including a plurality of downlink transmission beams associated with the valid downlink transmission beam, each downlink transmission beam corresponding to a group of beamforming weight values: a second beamforming unit configured to beamform each downlink transmission beam in the second set in accordance with a corresponding beamforming weight value, so as to acquire the second downlink transmission beam training signal; a second transmission unit configured to transmit the second downlink transmission beam training signal to the UE, so as to enable the UE to determine a second recommended beam in accordance with a predetermined measurement index for the second downlink transmission beam training signal; and a second reception unit configured to receive the second recommended beam-related information reported by the UE.

In some possible embodiments of the present disclosure, a spatial correlation between each downlink transmission beam in the second set and the valid downlink transmission beam may be greater than a predetermined threshold: or an angle difference between a spatial orientation of each downlink transmission beam in the second set and a spatial orientation of the valid downlink transmission beam may be within a predetermined range: or the second set may be a predefined set corresponding to the valid downlink transmission beam.

In some possible embodiments of the present disclosure, the second downlink transmission beam training signal and a training signal acquired after beamforming the valid downlink transmission beam in accordance with the corresponding beamforming weight value may be QCL with respect to one or more spatial angle parameters.

In some possible embodiments of the present disclosure, the first switching module 304 may include: a first determination unit configured to, when the target downlink transmission beam is different from the valid downlink transmission beam, determine whether the target downlink transmission beam is included in the second set; a first switching unit configured to, when the target downlink transmission beam is included in the second set, switch the valid downlink transmission beam into the target downlink transmission beam: and a second switching unit configured to, when the target downlink transmission beam is not included in the second set, transmit a downlink transmission beam switching notification message to the UE so as to enable the UE to update information about the valid downlink transmission beam stored in the UE in accordance with the downlink transmission beam switching notification message, and switch the valid downlink transmission beam into the target downlink transmission beam.

In some possible embodiments of the present disclosure, the downlink transmission beam switching notification message may include one or more of identification information about the target downlink transmission beam, information about a time interval, or indication information about a valid time-domain resource.

In some possible embodiments of the present disclosure, the first recommended beam-related information may include one or more of identification information about the first recommended beam, downlink time information, downlink frequency information, and intensity information about the first downlink transmission beam training signal. The second recommended beam-related information may include one or more of identification information about the second recommended beam, downlink time information, downlink frequency information, and intensity information about the second downlink transmission beam training signal.

In some possible embodiments of the present disclosure, the base station may further include a transmission module configured to transmit a downlink reception beam training signal to the UE, so as to enable the UE to determine a target downlink reception beam in accordance with a predetermined measure index for the downlink reception beam training signal, and enable the UE to perform a switching operation on a currently-adopted valid downlink reception beam in accordance with the target downlink reception beam.

In some possible embodiments of the present disclosure, the downlink reception beam training signal and the training signal acquired after beamforming the valid downlink transmission beam in accordance with the corresponding beamforming weight value may be QCL with respect to one or more spatial angle parameters.

According to the base station in the embodiments of the present disclosure, it is able to provide the downlink transmission beam determined after a two-stage beam training operation with high precision and small overhead, thereby to make a balance between the overhead and the precision during the beam training operation.

It should be appreciated that, the implementation of the base station may refer to that of the beam processing method mentioned hereinabove, with a same technical effect.

Figure 4:
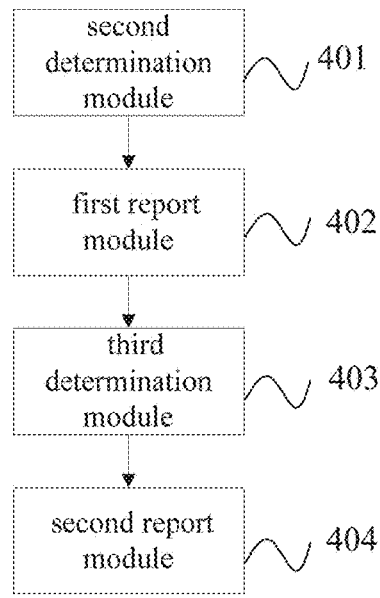
FIG. 4 is a schematic view showing a mobile terminal according to some embodiments of the present disclosure.

As shown in FIG. 4, the present disclosure further provides in some embodiments a mobile terminal which includes: a second determination module 401 configured to receive a first downlink transmission beam training signal from a base station, and determine a first recommended beam in accordance with the first downlink transmission beam training signal, the first downlink transmission beam training signal being acquired after beamforming by the base station each downlink transmission beam in a first set in accordance with a corresponding beamforming weight value, the first set including a plurality of downlink transmission beams, each downlink transmission beam corresponding to one group of beamforming weight values; a first report module 402 configured to report first recommended beam-related information to the base station; a third determination module 403 configured to receive a second downlink transmission beam training signal from the base station, and determine a second recommended beam in accordance with the second downlink transmission beam training signal: and a second report module 404 configured to report second recommended beam-related information to the base station, so as to enable the base station to determine a target downlink transmission beam in accordance with the first recommended beam-related information and the second recommended beam-related information, and enable the base station to perform a switching operation on one or more currently-adopted valid downlink transmission beams in accordance with the target downlink transmission beam.

According to the mobile terminal in the embodiments of the present disclosure, it is able to provide the downlink transmission beam determined after a two-stage beam training operation with high precision and small overhead, thereby to make a balance between the overhead and the precision during the beam training operation.

In some possible embodiments of the present disclosure, the second determination module 401 may include a third determination unit configured to determine the first recommended beam in accordance with a predetermined measurement index for the first downlink transmission beam training signal.

In some possible embodiments of the present disclosure, the mobile terminal may further include a fourth determination module configured to determine a downlink reception beam corresponding to the first recommended beam or each downlink transmission beam in the first set from predetermined candidate downlink reception beams in accordance with the predetermined measurement index for the first downlink transmission beam training signal received after beamforming each predetermined candidate downlink reception beam in accordance with a corresponding beamforming weight value.

In some possible embodiments of the present disclosure, the third determination module 403 may include a fourth determination unit configured to determine the second recommended beam in accordance with a predetermined measurement index for a second downlink transmission beam training signal received after beamforming a currently-adopted valid downlink reception beam in accordance with a corresponding beamforming weight value. The second downlink transmission beam training signal may be acquired after beamforming each downlink transmission beam in a second set in accordance with a corresponding beamforming weight value, the second set may include a plurality of downlink transmission beams associated with the valid downlink transmission beam, and each downlink transmission beam may correspond to a group of beamforming weight values.

In some possible embodiments of the present disclosure, the mobile terminal may further include: a first reception module configured to receive a downlink transmission beam switching notification message, the downlink transmission beam switching notification message including one or more of identification information about the target downlink transmission beam, information about a time interval, or indication information about a valid time-domain resource, the target downlink transmission beam being included in the first set: and an update module configured to update information about the valid downlink transmission beam stored in the UE in accordance with the downlink transmission beam switching notification message.

In some possible embodiments of the present disclosure, the mobile terminal may further include a second switching module configured to switch the valid downlink reception beam in accordance with the updated information about the valid downlink transmission beam.

In some possible embodiments of the present disclosure, the mobile terminal may further include: a fifth determination module configured to receive a downlink reception beam training signal, and determine a target downlink reception beam in accordance with a predetermined measurement index for the downlink reception beam training signal; and a third switching module configured to perform a switching operation on the currently-adopted downlink reception beam in accordance with the target downlink reception beam.

In some possible embodiments of the present disclosure, the fifth determination module may include a fifth determination unit configured to determine the target downlink reception beam from predetermined candidate downlink reception beams in accordance with the predetermined measurement index for the downlink reception beam training signal received after beamforming each predetermined candidate downlink reception beam in accordance with a corresponding beamforming weight value.

In some possible embodiments of the present disclosure, the downlink reception beam training signal and the training signal acquired after beamforming the valid downlink transmission beam in accordance with the corresponding beamforming weight value may be QCL with respect to one or more spatial angle parameters.

In some possible embodiments of the present disclosure, the predetermined measurement index may include a received signal power intensity or an SNR.

It should be appreciated that, the implementation of the mobile terminal may refer to that of the beam processing method mentioned hereinabove, with a same technical effect.

Figure 5:
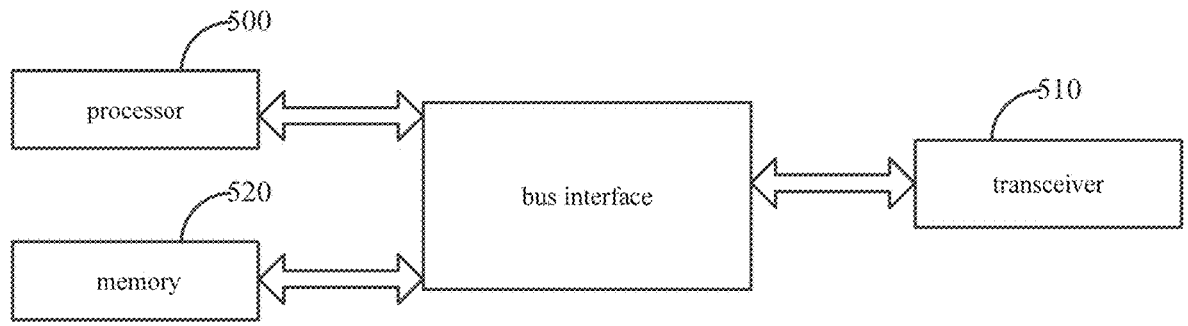
FIG. 5 is another schematic view showing the base station according to some embodiments of the present disclosure.

As shown in FIG. 5, the present disclosure further provides in some embodiments a base station which includes a processor 500, a transceiver 510, a memory 520 and a bus interface. The processor 500, the transceiver 510 and the memory 520 are connected to the bus interface. The processor 500 is configured to read a program stored in the memory 520, so as to: transmit through the transceiver 510 a first downlink transmission beam training signal to a UE, and receive first recommended beam-related information reported by the UE in accordance with the first downlink transmission beam training signal; transmit through the transceiver 510 a second downlink transmission beam training signal to the UE, and receive second recommended beam-related information reported by the UE in accordance with the second downlink transmission beam training signal; determine a target downlink transmission beam in accordance with the first recommended beam-related information and the second recommended beam-related information: and perform a switching operation on one or more currently-adopted valid downlink transmission beams in accordance with the target downlink transmission beam.

In FIG. 5, bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. The bus interface may be provided, and the transceiver 510 may consist of a plurality of elements, i.e., a transmitter and a receiver for communication with any other devices over a transmission medium. The processor 500 may take charge of managing the bus architecture as well as general processings. The memory 520 may store therein data for the operation of the processor 500.

It should be appreciated that, the implementation of the base station may refer to that of the beam processing method mentioned hereinabove, with a same technical effect.

Figure 6:
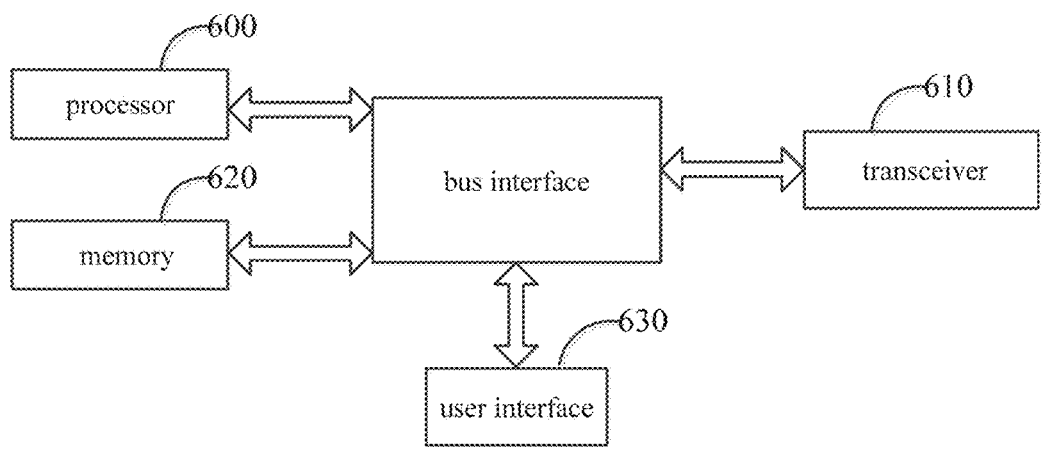
FIG. 6 is another schematic view showing the mobile terminal according to some embodiments of the present disclosure.
Figure 7:
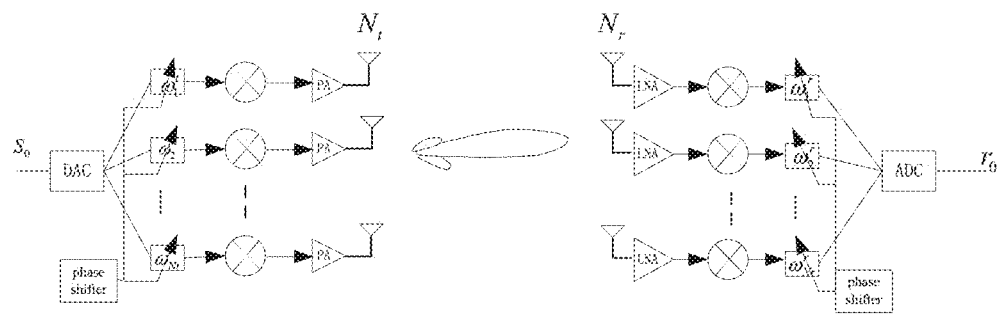
FIG. 7 is a schematic view showing analog beamforming transmission/reception architecture for beamforming a mid-frequency signal in the related art.
Figure 8:
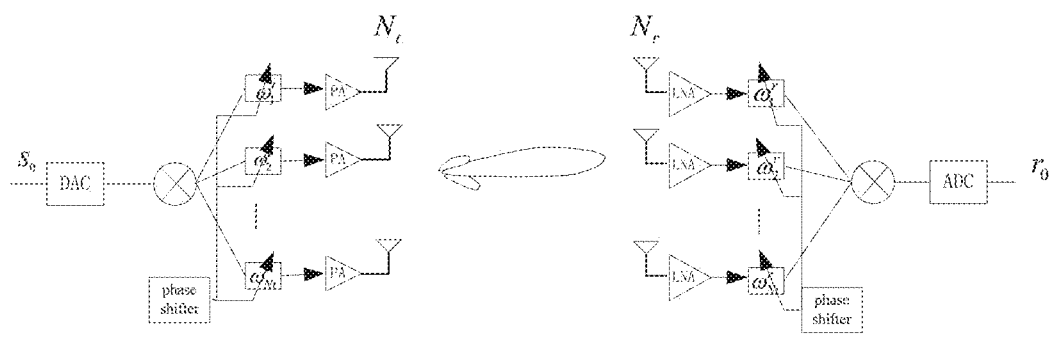
FIG. 8 is a schematic view showing the analog beamforming transmission/reception architecture for beamforming a radio-frequency signal in the related art.
Figure 9:
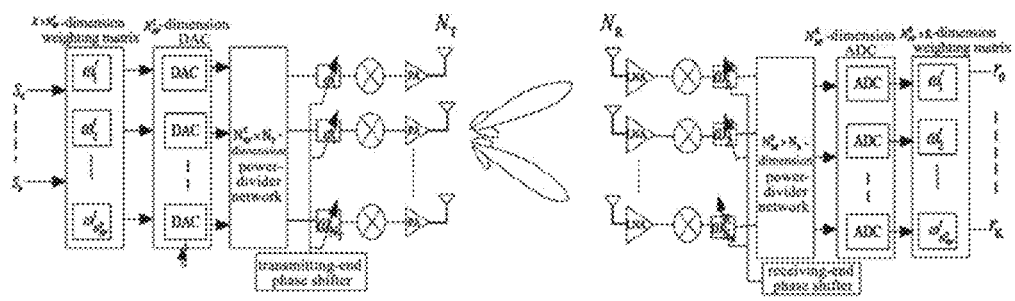
FIG. 9 is a schematic view showing digital-analog hybrid beamforming transmission/reception architecture in the related art.

As shown in FIG. 6, the present disclosure further provides in some embodiments a mobile terminal which includes a processor 600, a transceiver 610, a memory 620 and a bus interface. The processor 600, the transceiver 610 and the memory 620 are connected to the bus interface. The processor 600 is configured to read a program stored in the memory 620, so as to: receive through the transceiver 610 a first downlink transmission beam training signal from a base station, and determine a first recommended beam in accordance with the first downlink transmission beam training signal, the first downlink transmission beam training signal being acquired after beamforming by the base station each downlink transmission beam in a first set in accordance with a corresponding beamforming weight value, the first set including a plurality of downlink transmission beams, each downlink transmission beam corresponding to one group of beamforming weight values; report through the transceiver 610 first recommended beam-related information to the base station; receive through the transceiver 610 a second downlink transmission beam training signal from the base station, and determine a second recommended beam in accordance with the second downlink transmission beam training signal, and report through the transceiver 610 second recommended beam-related information to the base station, so as to enable the base station to determine a target downlink transmission beam in accordance with the first recommended beam-related information and the second recommended beam-related information, and enable the base station to perform a switching operation on one or more currently-adopted valid downlink transmission beams in accordance with the target downlink transmission beam.

In FIG. 6, bus architecture may include a number of buses and bridges connected to each other, so as to connect various circuits for one or more processors 600 and one or more memories 620. In addition, as is known in the art, the bus architecture may be used to connect any other circuits, such as a circuit for a peripheral device, a circuit for a voltage stabilizer and a power management circuit. The bus interface may be provided, and the transceiver 610 may consist of a plurality of elements, i.e., a transmitter and a receiver for communication with any other devices over a transmission medium. With respect to different UEs, a user interface 630 may also be provided for devices which are to be arranged inside or outside the UE, and these devices may include but not limited to a keypad, a display, a speaker, a microphone and a joystick. The processor 600 may take charge of managing the bus architecture as well as general processings. The memory 620 may store therein data for the operation of the processor 600.

It should be appreciated that, the implementation of the mobile terminal may refer to that of the beam processing method mentioned hereinabove, with a same technical effect.

It should be further appreciated that, serial numbers of the steps shall not be used to define the order of the steps, and instead, the order of the steps shall be determined in accordance with their functions and internal logics.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A beam processing method for use in a base station, comprising:
   transmitting a first downlink transmission beam training signal to a User Equipment (UE), and receiving first recommended beam-related information reported by the UE in accordance with the first downlink transmission beam training signal;
   transmitting a second downlink transmission beam training signal to the UE, and receiving second recommended beam-related information reported by the UE in accordance with the second downlink transmission beam training signal;
   determining a target downlink transmission beam in accordance with the first recommended beam-related information and the second recommended beam-related information; and
   performing a switching operation on one or more currently-adopted valid downlink transmission beams in accordance with the target downlink transmission beam,
   wherein the transmitting the first downlink transmission beam training signal to the UE and receiving the first recommended beam-related information reported by the UE in accordance with the first downlink transmission beam training signal comprises:
   determining a first set comprising a plurality of downlink transmission beams, each downlink transmission beam corresponding to a group of beamforming weight values;
   beamforming each downlink transmission beam in the first set in accordance with a corresponding beamforming weight value, so as to acquire the first downlink transmission beam training signal;
   transmitting the first downlink transmission beam training signal to the UE, so as to enable the UE to determine a first recommended beam in accordance with a predetermined measurement index for the first downlink transmission beam training signal, and enable the UE to determine a downlink reception beam corresponding to the first recommended beam or each downlink transmission beam in the first set; and
   receiving the first recommended beam-related information reported by the UE.

2. The beam processing method according to claim 1, wherein the transmitting the second downlink transmission beam training signal to the UE and receiving the second recommended beam-related information reported by the UE in accordance with the second downlink transmission beam training signal comprises:
   determining a second set comprising a plurality of downlink transmission beams associated with the valid downlink transmission beam, each downlink transmission beam corresponding to a group of beamforming weight values;
   beamforming each downlink transmission beam in the second set in accordance with a corresponding beamforming weight value, so as to acquire the second downlink transmission beam training signal;
   transmitting the second downlink transmission beam training signal to the UE, so as to enable the UE to determine a second recommended beam in accordance with a predetermined measurement index for the second downlink transmission beam training signal; and
   receiving the second recommended beam-related information reported by the UE.

3. The beam processing method according to claim 2, wherein a spatial correlation between each downlink transmission beam in the second set and the valid downlink transmission beam is greater than a predetermined threshold; or an angle difference between a spatial orientation of each downlink transmission beam in the second set and a spatial orientation of the valid downlink transmission beam is within a predetermined range; or the second set is a predefined set corresponding to the valid downlink transmission beam.

4. The beam processing method according to claim 2, wherein the second downlink transmission beam training signal and a training signal acquired after beamforming the valid downlink transmission beam in accordance with the corresponding beamforming weight value are quasi co-located (QCL) with respect to one or more spatial angle parameters.

5. The beam processing method according to claim 2, wherein the performing the switching operation on the currently-adopted valid downlink transmission beam in accordance with the target downlink transmission beam comprises:
- when the target downlink transmission beam is different from the valid downlink transmission beam, determining whether the target downlink transmission beam is comprised in the second set;
- when the target downlink transmission beam is comprised in the second set, switching the valid downlink transmission beam into the target downlink transmission beam; and
- when the target downlink transmission beam is not comprised in the second set, transmitting a downlink transmission beam switching notification message to the UE so as to enable the UE to update information about the valid downlink transmission beam stored in the UE in accordance with the downlink transmission beam switching notification message, and switch the valid downlink transmission beam into the target downlink transmission beam.

6. The beam processing method according to claim 5, wherein the downlink transmission beam switching notification message comprises one or more of identification information about the target downlink transmission beam, information about a time interval, or indication information about a valid time-domain resource.

7. The beam processing method according to claim 2, wherein the first recommended beam-related information comprises one or more of identification information about the first recommended beam, downlink time information, downlink frequency information, and intensity information about the first downlink transmission beam training signal; and
- the second recommended beam-related information comprises one or more of identification information about the second recommended beam, downlink time information, downlink frequency information, and intensity information about the second downlink transmission beam training signal.

8. The beam processing method according to claim 1, further comprising transmitting a downlink reception beam training signal to the UE, so as to enable the UE to determine a target downlink reception beam in accordance with a predetermined measure index for the downlink reception beam training signal, and enable the UE to perform a switching operation on a currently-adopted valid downlink reception beam in accordance with the target downlink reception beam.

9. The beam processing method according to claim 8, wherein the downlink reception beam training signal and the training signal acquired after beamforming the valid downlink transmission beam in accordance with the corresponding beamforming weight value are quasi co-located (QCL) with respect to one or more spatial angle parameters.

10. A base station, comprising a processor, a transceiver and a memory, wherein the processor is configured to read a program stored in the memory, so as to: transmit through the transceiver a first downlink transmission beam training signal to a UE, and receive first recommended beam-related information reported by the UE in accordance with the first downlink transmission beam training signal; transmit through the transceiver a second downlink transmission beam training signal to the UE, and receive second recommended beam-related information reported by the UE in accordance with the second downlink transmission beam training signal; determine a target downlink transmission beam in accordance with the first recommended beam-related information and the second recommended beam-related information; and perform a switching operation on one or more currently-adopted valid downlink transmission beams in accordance with the target downlink transmission beam,
- wherein the processor is further configured to:
- determine a first set comprising a plurality of downlink transmission beams, each downlink transmission beam corresponding to a group of beamforming weight values;
- beamform each downlink transmission beam in the first set in accordance with a corresponding beamforming weight value, so as to acquire the first downlink transmission beam training signal;
- transmit the first downlink transmission beam training signal to the UE, so as to enable the UE to determine a first recommended beam in accordance with a predetermined measurement index for the first downlink transmission beam training signal, and enable the UE to determine a downlink reception beam corresponding to the first recommended beam or each downlink transmission beam in the first set; and
- receive the first recommended beam-related information reported by the UE.

* * * * *